WILLIAM S. HARRIS
INVENTOR.

ent Office 3,532,546
Patented Oct. 6, 1970

3,532,546
NONAQUEOUS LIQUID AMMONIA CURRENT
PRODUCING CELLS USING INSOLUBLE
ACID AND NEUTRAL ELECTROLYTE
William S. Harris, Corona, Calif., assignor to the United
States of America as represented by the Secretary of
the Navy
Continuation-in-part of application Ser. No. 538,909,
Mar. 28, 1966. This application July 1, 1969, Ser. No.
838,127
Int. Cl. H01m 17/06
U.S. Cl. 136—83                                        10 Claims

ABSTRACT OF THE DISCLOSURE

A nonaqueous liquid ammonia current producing cell using insoluble acid and neutral electrolyte for reducing anode corrosion and permitting long life batteries.

The invention herein described may be manufactured and used by or for the Government of the United States of America for governmental purposes without the payment of any royalties thereon or therefor.

This application is a continuation-in-part of U.S. patent application, Ser. No. 538,909, filed Mar. 28, 1966, now abandoned, for Dual Purpose Cathode-Electrolyte for Ammonia Batteries.

The present invention relates to a new kind of galvanic cell, and more particularly to a nonaqueous cell which uses an insoluble compound to meet the acid requirement of the reducible cathode reactant.

The primary purpose of this invention is to provide a new principle of cell design and operation. This invention meets this purpose and also provides significant improvements in performance of ammonia cells by eliminating a major shortcoming in prior art cells, namely high anode corrosion. This invention is directly applicable to reserve ammonia-activated primary cells and its principle is applicable to high-energy liquid-fed ammonia system fuel cells.

Ammonia activated primary cells are normally constructed so that after activation a typical such cell has the following construction: A metallic anode (usually magnesium); a restrained electrolyte consisting of a fibrous support (usually glass fiber filterpaper) saturated with a liquid ammonia solution of an inorganic salt (usually KSCN or, $NH_4SCN$) which serves as the electrolyte; a porous cathode structure consisting of an electronically-conducting matrix (often powdered graphite), a cathode oxidant (often m-dinitrobenzene or 2,4 dinitroaniline) in the matrix as the reactant material and a soluble acid (often $NH_4SCN$). The porous cathode is permeated with electrolyte solution. A metal (often Ag or stainless steel) electronically connects the porous cathode structure to the external circuit. The cathode reaction occurs on the porous electronically conducting matrix. Disadvantages of the previous methods are: High anode corrosion from the soluble acid that diffuses to the anode from the cathode. This invention eliminates the soluble acid and hence decreases anode corrosion, and permits long life batteries.

The present invention is the first of its kind in non-aqueous cell technology, i.e., the first nonaqueous cell to use an insoluble acid to provide the acid requirement for cathode reduction in liquid ammonia.

It is an object of the present invention to provide improved batteries by using new materials in batteries to greater advantage.

Still another object is to provide improved reserve ammonia-activated primary cells.

Other objects and many of the attendant advantages of this invention will become readily appreciated as the same becomes better understood by reference to the following detailed description when considered in connection with the accompanying drawings wherein.

Figure 1:
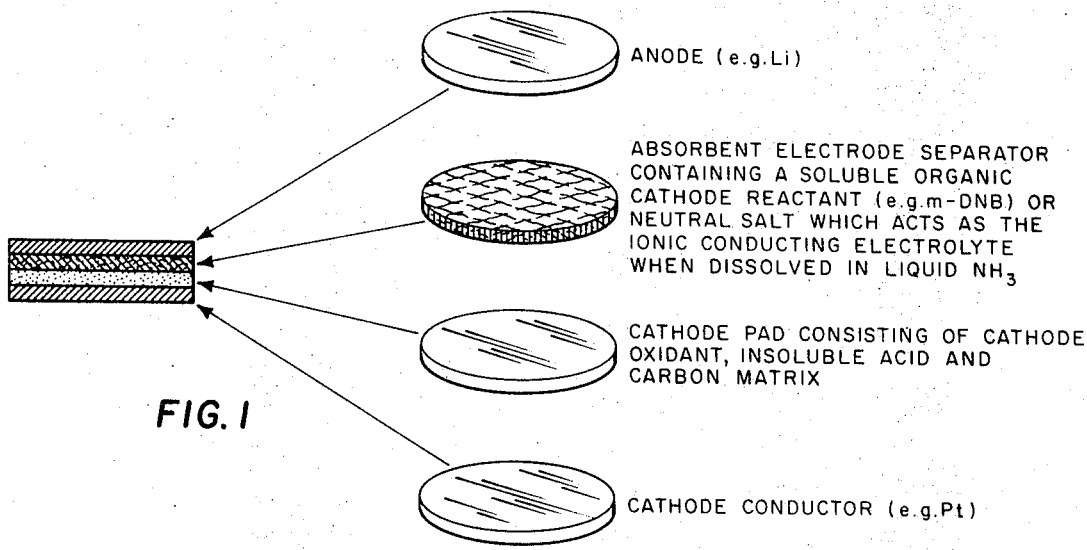
FIG. 1 is a diagrammatic sketch showing typical basic components forming an electrochemical cell construction of the present invention.

An embodiment of this invention is an electrochemical cell, such as shown in FIG. 1, of the following description:

Li/m-dinitrobenzene electrolyte-cathode oxidant in liquid ammonia/ammonium sulphate in porous carbon/Pt.

Lithium metal is used as the anode. The m-dinitrobenzene (m-DNB) in solution in liquid ammonia is used for dual purpose performance, both as the active cathode material which is reduced during the electrochemical power-producing reaction and as the sole ionicly conducting electrolyte between anode and cathode conductor. The platinum is the cathode conductor and serves as the metallic conductor from an external circuit. The porous carbon evenly distributed with ammonium sulphate serves as the reaction site for cathode reaction. In the electrolyte pad an inert material such as glass fiber filter paper serves two functions: first, it physically separates anode and cathode conductive matrix to prevent electronic shorting and second, it is an absorbent for the electrolyte-oxidant solution. A further consequence of its use is to provide ease in the assembly of cells. In both the old and instant methods, electrolyte or cathode materials are impregnated into the absorbent which are then easily handled as one unit. The operation of the newly-invented cell is similar to that of the "usual" or prior type of ammonia battery. Before activation, while in the inactive state, a typical cell, of the present invention for example, contains a Li anode, an electrode separator impregnated with m-dinitrobenzene, and a porous carbon and ammonium sulphate cathode. The necessary liquid ammonia is stored external to the cell proper. The process of activation consists of injecting the liquid ammonia into the impregnated electrode separator. The m-dinitrobenzene rapidly forms a highly conducting solution and the cell is ready for operation.

After activation, the cell produces electric energy from chemical energy by means of the reactions at the electrodes. Li is oxidized and the m-dinitrobenzene is reduced.

Figure 2:
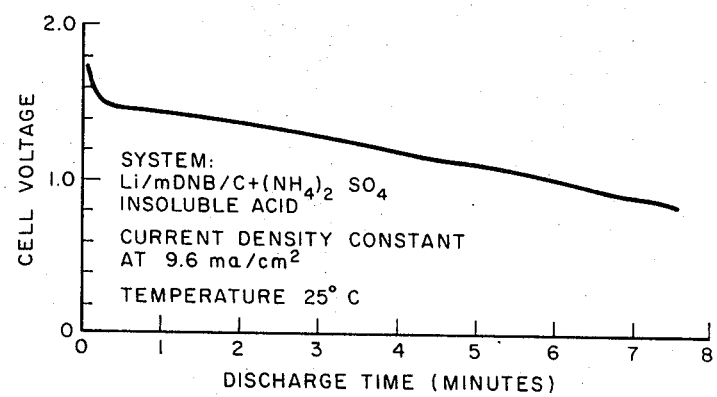
FIG. 2 shows cell voltage vs. discharge time for a call of the instant invention.

The curve of FIG. 2 for a low rate discharge was made using a cell as in FIG. 1 having a Li anode, m-dinitrobenzene as cathode reactant and electrolyte (when dissolved in liquid $NH_3$), and a carbon matrix containing $(NH_4)_2SO_4$ as the insoluble acid, and Pt cathode conductor.

Such insoluble acids will not contribute to electrolyte conduction although they do assist the cathode reaction. In making the cathode the $(NH_4)_2SO_4$ is evenly distributed in the conducting matrix (carbon).

Figure 3:
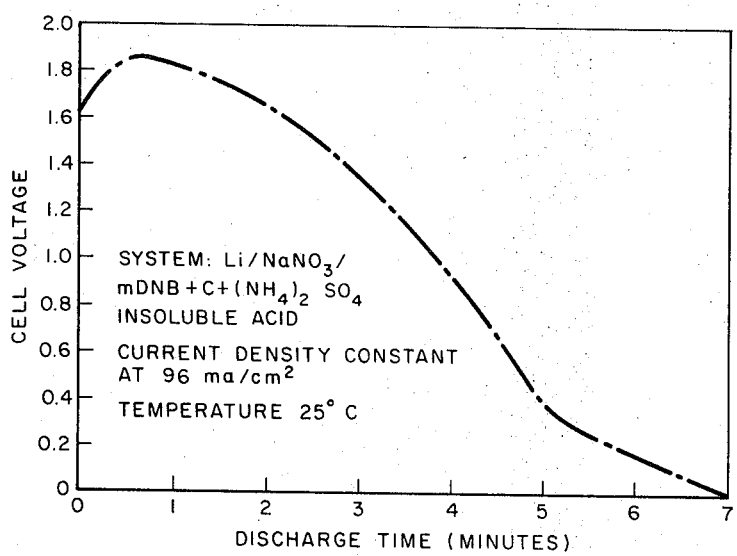
FIG. 3 shows cell voltage vs. discharge time for another cell of the instant invention.

The curve of FIG. 3 showing a high rate discharge was made utilizing a cell of the following construction: Li anode/$NaNO_3$ as a neutral electrolyte (when in $NH_3$ solution)/porous carbon matrix containing $(NH_2)_2SO_4$ as the acid insoluble in ammonia and m-dinitrobenzene the cathode reactant on Pt as the cathode conductor.

A different method of activation would be to make a solution of m-dinitrobenzene or neutral salt in liquid ammonia and inject this dual purpose cathode reactant-electrolyte solution or neutral salt solution into an unimpregnated absorbent electrode separator. This alternate method is called solution activation, whereas the first method is normally called solvent activation. The solution of m-dinitrobenzene in liquid ammonia is a true organic electrolyte, and contains no metal ions. The m-dinitrobenzene in this solution acts both as the reducible cathode reactant and as the ionic conducting electrolyte.

Other alkaline earth metals and alkali metals may possibly be used as anode materials.

Specific aromatic nitro compounds when used as electrolyte and cathode are chosen from those that are both soluble in liquid ammonia and highly ionized to form electrolytically conducting solutions. The choice of the soluble nitro compound chosen for cathode oxidant electrolyte is very important since many which are soluble will not produce conducting solutions. The most suitable alternates would be dinitro compounds in which the nitro groups are in the meta-relationship. The ortho and para series of dinitro-compounds form less conducting solution [Smith, Herchel, Organic Reactions in Liquid Ammonia. (Part of a series, "Chemistry in Nonaqueous Ionizing Solvents," vol. 1, part 2) Brunswick, Germany, Friedr. Vieweg and Sohn, 1963].

Other examples of insoluble acids are $NH_4F$, $(NH_4)_2HPO_4$, $(NH_4)_3PO_4$. The reaction of $NH_3$ with heavy metal sulphates produces an ammoniated sulphate, not, and distinctly different from ammonium sulphate, i.e.

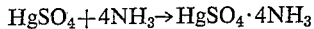
$$HgSO_4 + 4NH_3 \rightarrow HgSO_4 \cdot 4NH_3$$

No ammonium ions are produced and therefore ammonium sulphate $(NH_4)_2SO_4$ is not produced.

Other materials than platinum may be used for the cthode conductor. Typical other useful metals are stainless steel, gold, silver and carbon. The cathode conductor should be an inert metal (i.e., not rapidly dissolved by liquid ammonia solutions). Also, a porous matrix of carbon can also be used instead of a planar surface.

Since the cathodic reactant may be made into a solution, it is eminently suitable for an ammonia system fuel cell utilizing a liquid reactant feed.

What is claimed is:

1. A nonaqueous liquid ammonia primary battery, comprising:
   (a) a lithium anode,
   (b) a cathode conductor of a material not rapidly dissolved by nonaqueous liquid ammonia,
   (c) a dual purpose cathode reactant-electrolyte consisting of an aromatic nitro compound that is both soluble in nonaqueous liquid ammonia and highly ionized to form an electrolytically conducting solution containing no metal ions, the nitro compound acting both as the cathode oxidant and as the ionic conducting electrolyte when dissolved in the liquid ammonia,
   (d) said soluble reducible cathode reactant material consisting of m-dinitrobenzene,
   (e) said cathode conductor consisting essentially of a porous carbon matrix structure and having included substantially uniformly in the porous cathode conductor structure electrolyte insoluble $(NH_4)_2SO_4$ acid which assists the cathode reaction while not contributing to electrolyte conduction and anode corrosion,
   (f) an absorbent electrode separator between said anode and cathode conductor for physically separating the electrodes to prevent electronic shorting and for retaining the nonaqueous electrolyte-oxidant solution.

2. A battery as in claim 1 in which the solution of m-dinitrobenzene is added to the cells when it is desired to activate the battery.

3. A battery as in claim 1 wherein the cathode conductor is platinum.

4. A battery as in claim 1 wherein the m-dinitrobenzene is contained in said absorbent separator and is dissolved in nonaqueous liquid $NH_3$ to form a solution when it is desired to activate the battery by injecting the liquid $NH_3$ into said absorbent separator.

5. A nonaqueous liquid ammonia battery as in claim 1 wherein $NaNO_3$ is included as a neutral electrolyte when dissolved in the liquid ammonia.

6. A battery as in claim 5 in which the solution of m-dinitrobenzene is added to the cells when it is desired to activate the battery.

7. A battery as in claim 5 wherein the cathode conductor is platinum.

8. A battery as in claim 5 wherein the m-dinitrobenzene and the $(NH_4)_2SO_4$ insoluble acid are contained in the absorbent separator and the m-dinitrobenzene is dissolved in nonaqueous liquid $NH_3$ to form a solution when it is desired to activate the battery by injecting the liquid $NH_3$ into said absorbent separator.

9. A nonaqueous liquid ammonia primary battery, comprising:
   (a) a lithium anode,
   (b) a cathode conductor of a material not rapidly dissolved by nonaqueous liquid ammonia,
   (c) a neutral electrolyte soluble in the liquid ammonia,
   (d) a reducible cathode reactant material consisting of m-dinitrobenzene which is soluble in liquid ammonia,
   (e) said cathode conductor consisting essentially of a porous carbon matrix structure and haiving included substantially uniformly in the porous cathode conductor structure said cathode reactant and insoluble $(NH_4)_2SO_4$ acid which assists the cathode reaction while not contributing to electrolyte conduction and anode corrosion,
   (f) an absorbent electrode separator between said anode and cathode conductor for physically separating the electrodes to prevent electronic shorting and for retaining the nonaqueous neutral electrolyte solution.

10. A battery as in claim 9 wherein said neutral electrolyte is $NaNO_3$.

References Cited

UNITED STATES PATENTS

| | | | |
|---|---|---|---|
| 2,992,289 | 7/1961 | Meyers | 136—90 |
| 2,996,562 | 8/1961 | Meyers | 136—6 |
| 3,185,590 | 5/1965 | Mayer et al. | 136—6 |
| 3,235,408 | 2/1966 | Harris | 136—90 |
| 3,239,384 | 3/1966 | Meyers | 136—90 |
| 3,423,242 | 1/1969 | Meyers et al. | 136—6 |

WINSTON A. DOUGLAS, Primary Examiner

A. SKAPARS, Assistant Examiner

U.S. Cl. X.R.

136—90, 100